Oct. 23, 1923.
H. D. MILLER
AUTOMOBILE STEP
Filed April 7, 1923 — 2 Sheets-Sheet 1
1,471,972
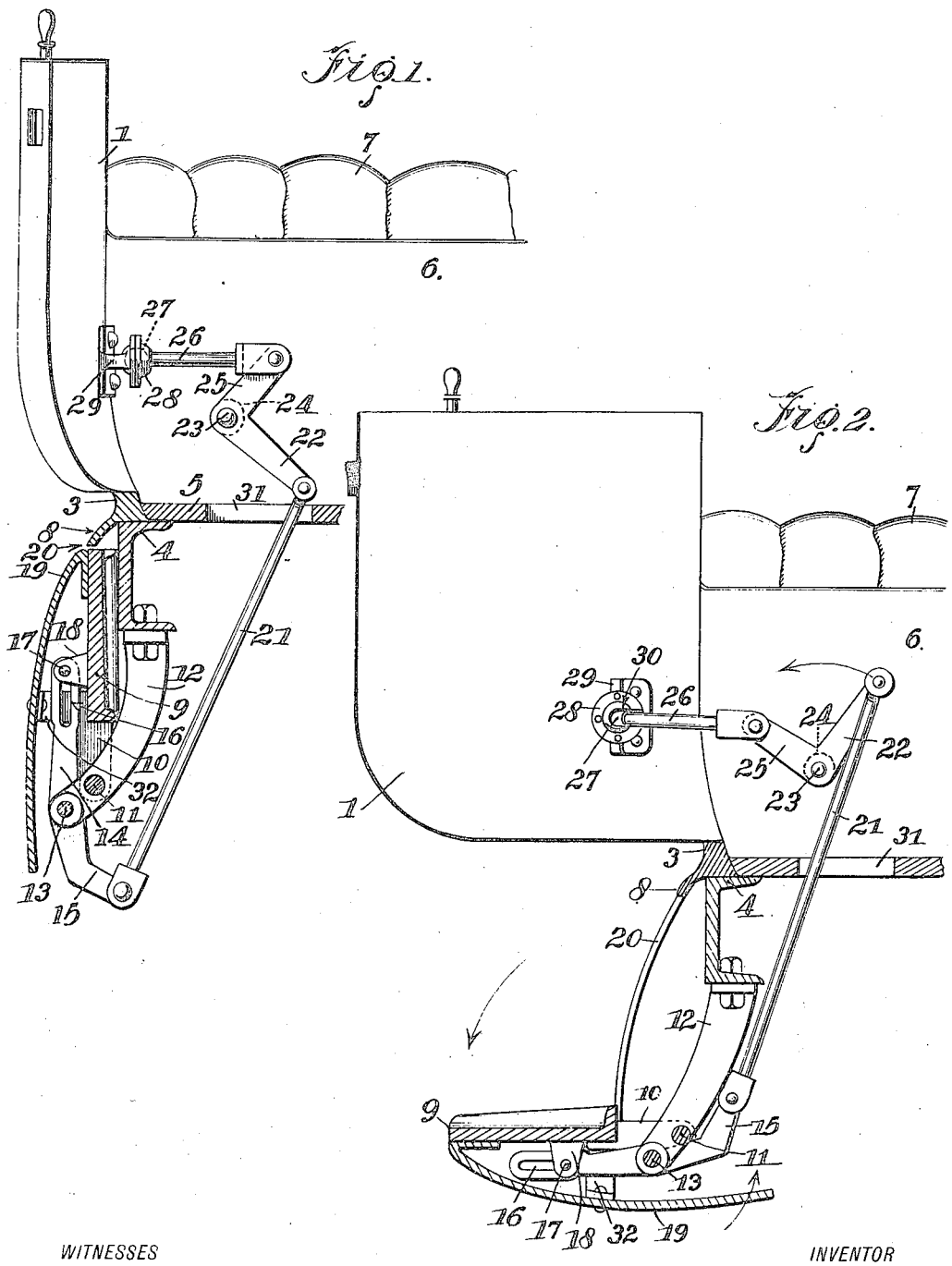
WITNESSES
INVENTOR
H. D. Miller
ATTORNEYS

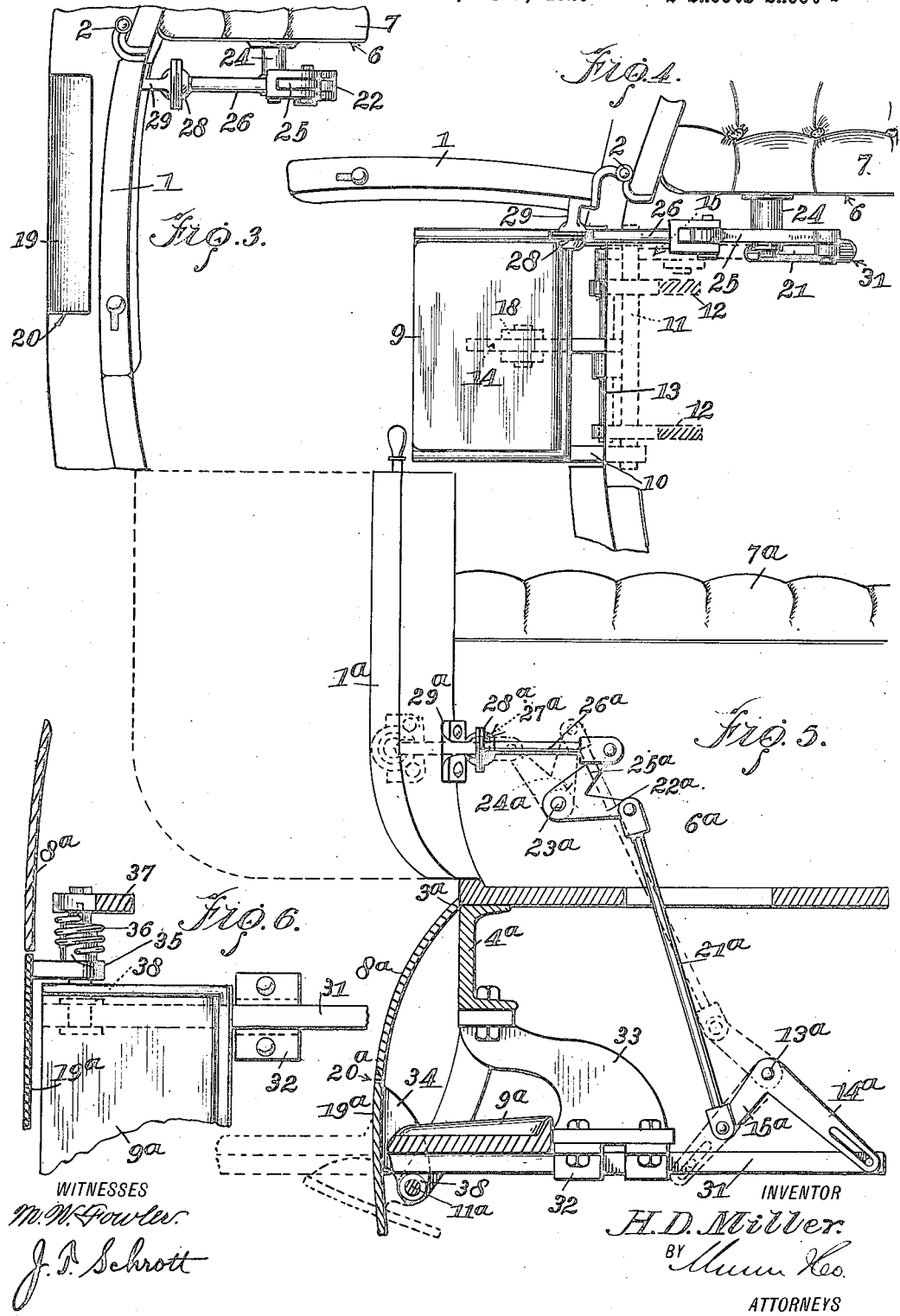

Patented Oct. 23, 1923.

1,471,972

UNITED STATES PATENT OFFICE.

HENRY DAVID MILLER, OF OKLAHOMA CITY, OKLAHOMA.

AUTOMOBILE STEP.

Application filed April 7, 1923. Serial No. 630,517.

*To all whom it may concern:*

Be it known that I, HENRY DAVID MILLER, a citizen of the United States, and a resident of Oklahoma city, in the county of Oklahoma and State of Oklahoma, have invented certain new and useful Improvements in Automobile Steps, of which the following is a specification.

My invention relates to improvements in automobile bodies, consisting more particularly in an improvement in the steps by means of which entrance is facilitated, and it consists of the constructions, combinations and arrangements herein described and claimed.

An object of the invention is to provide what might be termed a disappearing step for an automobile, the purpose of which is to replace the well-known stationary running board.

Another object of the invention is to provide a step which is so connected with the door that the step is retracted to a closed position when the door is closed and moved to an extended position when the door is opened.

Other objects and advantages will appear in the following specification, reference being had to the accompanying drawings, in which:

Fig. 1 is a detail cross section through a portion of an automobile body showing a swinging type of step connected with a door, the door and step being closed, Fig. 2 is a similar view showing the door and step open, Fig. 3 is a detail plan view of the parts shown in Fig. 1, Fig. 4 is a detail plan view of the parts shown in Fig. 2, Fig. 5 is a detail sectional view corresponding with Fig. 1 but showing a modification wherein the step is slidably extended and retracted instead of swung down and up, and Fig. 6 is a detail plan view of a portion of the structure in Fig. 5 showing one of the springs which causes the closure apron to follow the step.

The construction comprises an automobile door 1 which is hinged at 2 so as to swing outwardly according to the universal custom. This door is mounted on the body 3 of the automobile. The body is supported by a chassis of which the channel iron 4 (Figs. 1 and 2) is a part. The channel iron supports the floor 5 of the automobile. The front wall 6 of the seat 7 furnishes a support upon which a part of the invention is mounted. The automobile body includes a side closure 8 which in some cases curves downwardly and in other cases is straight, but in all cases is for the purpose of hiding parts of the chassis and mechanism which would otherwise be visible from the sides of the automobile.

The parts so far described are all common in automobiles. The improved automobile, that is to say an automobile which is constructed in accordance with the invention, will have no running board. In place of this running board, provision of a step 9 is made. This step and the parts by which it is operated, constitute the invention. The step 9 has brackets 10 at each end. These are mounted upon a step shaft 11 so that the step 9 is able to turn from the closed position in Fig. 1 to the open or extended position in Fig. 2.

Bearings 12 support the shaft 11 and also a shaft 13 upon which the arms 14 and 15 of a bell crank are fixed. These arms are not made into one bell crank, as might appear from Figs. 1 and 2, but are separated as shown in Fig. 4. This is for the purpose of getting the arm 14 in the middle of the step 9. The arm 15 is situated near that side of the step 9 which is nearest the hinges 2 of the door.

The shaft 13 is situated slightly lower than the shaft 11 and a little to the front, as shown in Figs. 1 and 2. The shaft 11 serves as a stop to limit the downward or extending movement of the step 9. The arm 15 of the bell crank engages the shaft 11 and thus forms the stop. The outer end of the arm 14 has a slot 16 through which it engages the pin 17 of a bracket 18 situated beneath the step. This slot is sufficiently long to compensate for the differential motion of the step and of the arm 14 of the bell crank which necessarily occurs by virtue of the fact that these parts swing on different axes.

Fastened to the bottom of the step 9 is a metallic sheet or apron 19. This apron is of a configuration corresponding to the cover portion 8 of the automobile body. This cover has an opening 20 through which the step 9 moves to the closed position (Fig. 1). This opening is filled or closed by the apron 19 when the step is closed as described, thus preserving the contour of the cover 8 and making it appear as though the automobile had no step.

A link 21 is connected between the free end of the arm 15 and the corresponding end of an arm 22 of a bell crank which is pivoted at 23 upon a suitable support 24 on the front wall 6 of the seat. The other arm 25 of this bell crank has connection with a short link 26 which carries a ball head 27. This ball head is clamped in position in the socket 28 of a bracket 29 on the door 1. The socket 28 is perfectly rigid on the bracket and the bracket is fixed to the door. The socket 28 therefore stands facing the observer (Fig. 2) when the door 1 is opened. In view of the fact that the link 26 is movable only in a direction crosswise of the automobile, provision for this particular motion must be made at the ball and socket joint. The socket is therefore slotted at 30 (Fig. 2) to permit the bracket 29 to describe the 90° of movement between the closed and open positions of the door 1.

The link 21 passes through an opening 31 in the floor 5 of the automobile. This opening is but a little wider than the link is thick and therefore does not mar the appearance of the floor. The apron 19 is fixedly attached to the step 9, one or more braces 32 being employed for the purpose of supporting the otherwise loose lower end of the apron. It is to be observed that the arm 14 of the bell crank operates in the space between the apron and the bottom of the step, the apron therefore performing the additional function of concealing this particular part of the step operating mechanism. The bell crank 22, 25 in the automobile is not shown concealed in the drawings, but they may be should it be so desired to erect a guard or perhaps re-design the parts so that the bell cranks may be mounted behind the front wall instead of in the open.

The modification in Figs. 5 and 6 discloses a step 9$^a$ which is slidable into retracted and extended positions instead of being rockable as in Figs. 1 and 2. The principle of operation is identical in respect to the mechanism from the door 1$^a$ down to the connection of the arm 14$^a$ with immediate parts of the step. The door 1$^a$ carries a bracket 29$^a$ which has a socket 28$^a$ in which the ball 27$^a$ is mounted. This ball is part of a link 26$^a$ which has connection with an arm 25$^a$ of a bell crank, the other arm 22$^a$ of which is joined with a link 21$^a$ which in turn is joined with the arm 15$^a$ of the bell crank mentioned before.

The bell crank 22$^a$, 25$^a$ is pivoted at 23$^a$ upon a suitable mounting 24$^a$ on the front wall 6$^a$ of the seat 7$^a$. The bell crank 14$^a$, 15$^a$ is pivoted at 13$^a$ upon any convenient support which may either be present in the construction of the car or which may be provided for the purpose. The support is omitted in the drawings.

A slide bar 31, of which two are provided in practice, is mounted in bearings 32 carried by a bracket 33 which in turn is fixed to the adjacent channel iron 4$^a$. These slide bars (the reader must bear in mind that there should be two) carry the step 9$^a$. This step is movable in an opening 20$^a$ in the cover portion 8$^a$ of the body 3$^a$.

An apron 19$^a$ is adapted to close the opening when the step is retracted as shown in full lines in Fig. 5. The apron has arms 34 which are mounted to turn on a shaft 11$^a$. This shaft, in a measure, corresponds with the shaft 11 in Fig. 1, although there it carries the step 9 per se whereas in Figs. 5 and 6, it carries only the apron. Each arm has a hub 35 (Fig. 6) which provides ample bearing on the shaft 11$^a$. A spring 36 fastened at one end to the hub 35 and at the other end to a bracket 37 which supports the adjacent end of the shaft, causes the apron 19$^a$ to move to the closing position when the step is retracted.

Upon extending the step 9$^a$, the front edge thereof pushes on the apron 19$^a$ causing it to move down into position beneath the step. The slide bars 31 move across the shaft 11$^a$ which aids in supporting them. Rollers 38 on the shaft 11$^a$ receive the slide bars and aid in the extending movement.

The operation may be briefly reviewed to advantage. Consider the door 1 as being closed as shown in Fig. 1. The step 9 occupies the closed or retracted position. The adjacent channel iron 4 forms a stop which limits the closing movement of the step.

Assume that the door 1 is pulled open. The various motions of the bell cranks 22 and 15 and of the door 9 will follow as indicated by the arrows in Fig. 2. The arm 22 of the bell crank in the automobile has a lifting action on the link 21 which in turn lifts the arm 15 and turns the shaft 13 so that the arm 14 moves the step 9 down. The engagement of the arm 15 with the step shaft 11 furnishes a brace for supporting the step and also for limiting the downward movement. The door 1 is therefore not depended upon to hold the step 9 in position.

In respect to the modification in Fig. 5, the opening of the door 1$^a$ will rock the bell crank 22$^a$, 25$^a$ so as to produce a lifting action of the link 21$^a$. This will turn the bell crank 14$^a$, 15$^a$ in such a manner as to push out on the slide rods 31 and move the step 9$^a$ into the extended position. This movement of the step depresses the apron 19$^a$ against the tension of the spring 36 (Fig. 6). The tension of the spring keeps the apron in contact with the bottom of the step and prevents any rocking which might occur were the apron loose. The apron will follow the step upon retraction of the latter. The slide rods 31 ride on the rollers 38 on the apron shaft 11ª, this shaft therefore aiding in the support of the slide rods.

While the construction and arrangement of the improved automobile step as herein described and claimed, is that of a generally preferred form, obviously modifications and changes may be made without departing from the spirit of the invention or the scope of the claims.

I claim:—

1. In combination with the door and chassis cover sheet of an automobile, a step situated behind said cover sheet, and means furnishing a connection between said step and the door moving the step to an extended position through said sheet when the door is opened and retracting it behind the sheet when the door is closed, and an apron which is adapted to move with the step to conceal the step when in a retracted position.

2. In combination with the door and chassis cover sheet of an automobile said sheet having an opening, a step mounted behind the cover sheet adjacent to said opening, a bracket which is connected to the door, means which connects the bracket with the step in such a manner as to move the step through said opening into an extended position when the door is opened and vice versa, and an apron adapted to move with the step to close the opening and hide the step when the step is in a retracted position.

3. In combination with the door and chassis cover sheet of an automobile said sheet having an opening, a step mounted behind said sheet to move through said opening into an extended position, fixed supporting means upon which the step is mounted to move, an apron so mounted as to follow the step said apron moving beneath the step when extended and moving back into the opening when the step is retracted to thereby close the opening and conceal the step, a bracket carried by the door, a rockable element in connection with the bracket, a rockable element in connection with the step, and a link connecting parts of said rockable element to transmit the opening and closing movements of the door to the step.

4. In combination with the door and chassis cover sheet of an automobile said sheet having an opening, a bracket having a ball socket fixed to the door, a bell crank mounted to rock adjacent to the door, a link having a ball head fitted in said socket and connected to the bell crank to rock the latter when the door opens and closes, a step situated behind said cover sheet, means upon which said step is mounted to move in respect to the opening, an adjacent bell crank having connection with a part of the step, a link connecting both bell cranks so that the movements of the door cause corresponding movements of the step, and an apron mounted to follow the door being adapted to close the opening when the step is retracted and the door is closed.

5. In combination with a door, chassis channel iron and cover sheet of an automobile, a step situated behind said cover sheet, means pendent from the channel iron by which the step is supported, a bell crank having one arm in connection with a part of the step, a bell crank situated in the automobile, a link connecting one arm thereof with the remaining arm of the step bell crank, a bracket caried by the door, a link connecting said bracket with the remaining arm of the bell crank in the automobile the rocking of said bell cranks upon an opening and closing of the door causing corresponding movement of the step through an opening in said cover sheet, and an apron mounted to follow the step closing the opening when the door is closed and assuming a depressed position with the step when the door is open.

6. An automobile step carrying means by which it is mounted, supporting means with which said mounting means has engagement and upon which the step is adapted to move to extended and retracted positions, and a shaft situated slightly below said supporting means adapted to be engaged by said mounting means when the step is extended to assist in the support thereof.

7. An automobile step having hinged brackets, a step shaft upon which said brackets are mounted to turn, a bell crank shaft situated slightly below and forwardly of the step shaft, a bell crank carried by said shaft, means by which one end of the bell crank is connected with the step, and means in connection with the other arm of the bell crank adapted to rock the bell crank and cause the step to be lowered and lifted.

8. In combination with the chassis channel iron and cover sheet of an automobile said sheet having an opening, a step situated behind said sheet adjacent to the opening, hinge brackets carried by the step, a step shaft upon which said brackets are mounted, a bell crank shaft situated below and forwardly of the step shaft, bearings pendent from the channel iron supporting both shafts, a bell crank mounted on the bell crank shaft having an arm in connection with the step, and door-operated means in connection with the other arm of said bell crank for rocking the step on its shaft said hinge brackets being adapted to contact the bell crank shaft and furnish a support limiting the lowering movement of the step.

9. In combination with the chassis channel iron and cover sheet of an automobile said sheet having an opening, a step situated behind said sheet adjacent to the opening, hinge brackets carried by the step, a step shaft upon which said brackets are mounted, a bell crank shaft situated below and forwardly of the step shaft, bearings pendent from the channel iron supporting both shafts, a bell crank mounted on the bell crank shaft having an arm in connection with the step, door-operated means in connection with the other arm of said bell crank for rocking the step on its shaft said hinge brackets being adapted to contact the bell crank shaft and furnish a support limiting the lowering movement of the step, and an apron carried by the step having the contour of said cover sheet and being adapted to fill said opening when the step is in the raised position behind said sheet.

10. In combination with the chassis channel iron and cover sheet of an automobile said sheet having an opening, a step situated behind said sheet, slide rods by which the step is carried, means affixed to the channel iron furnishing a support in which said rods are slidable, an apron adapted to fit in said opening when the step is retracted, a shaft upon which the apron is mounted to turn, brackets pendent from the channel iron furnishing a support for said shaft, springs fitted between said brackets and parts of the apron causing the apron to follow the step when extended and retracted in respect to said opening, a bell crank having one arm in connection with a slide rod, and door-operated means in connection with the other arm causing said bell crank to rock and the step to be extended and retracted in consonance with opening and closing movement of a door.

HENRY DAVID MILLER.